No. 800,642. PATENTED OCT. 3, 1905.
V. E. GUSTUS.
POULTRY ROOST.
APPLICATION FILED MAR. 11, 1905.

2 SHEETS—SHEET 1.

Witnesses
Jas. K. McCathran
N. F. Riley

Victor E. Gustus, Inventor
By C. G. Siggers
Attorney

No. 800,642. PATENTED OCT. 3, 1905.
V. E. GUSTUS.
POULTRY ROOST.
APPLICATION FILED MAR. 11, 1905.

2 SHEETS—SHEET 2.

Witnesses
Jas. K. McCathran
H. F. Riley

Victor E. Gustus, Inventor
By C. G. Siggers
Attorney

UNITED STATES PATENT OFFICE.

VICTOR EMANUEL GUSTUS, OF HAYS TOWNSHIP, IDA COUNTY, IOWA.

POULTRY-ROOST.

No. 800,642.　　　　　Specification of Letters Patent.　　　　　Patented Oct. 3, 1905.

Application filed March 11, 1905. Serial No. 249,633.

*To all whom it may concern:*

Be it known that I, VICTOR EMANUEL GUSTUS, a citizen of the United States, residing in Hays township, in the county of Ida and State of Iowa, have invented a new and useful Poultry-Roost, of which the following is a specification.

The invention relates to improvements in poultry-roosts.

The object of the present invention is to improve the construction of poultry-roosts and to provide a simple, inexpensive, and efficient one of great strength and durability, adapted to be readily applied to a poultry or hen house and capable of enabling the perch-bars to be readily folded out of the way to afford free access to the poultry or hen house to facilitate cleaning the same.

A further object of the invention is to enable the perch-bars to be readily rotated to present both their side faces and edges for cleaning and to be swung downward to a vertical position to facilitate the removal of accumulation.

Another object of the invention is to enable the perch-bars to be firmly held in position for use and to provide means for simultaneously clamping and releasing the same and for supporting the perch-bars in a convenient position for folding when the same are released.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
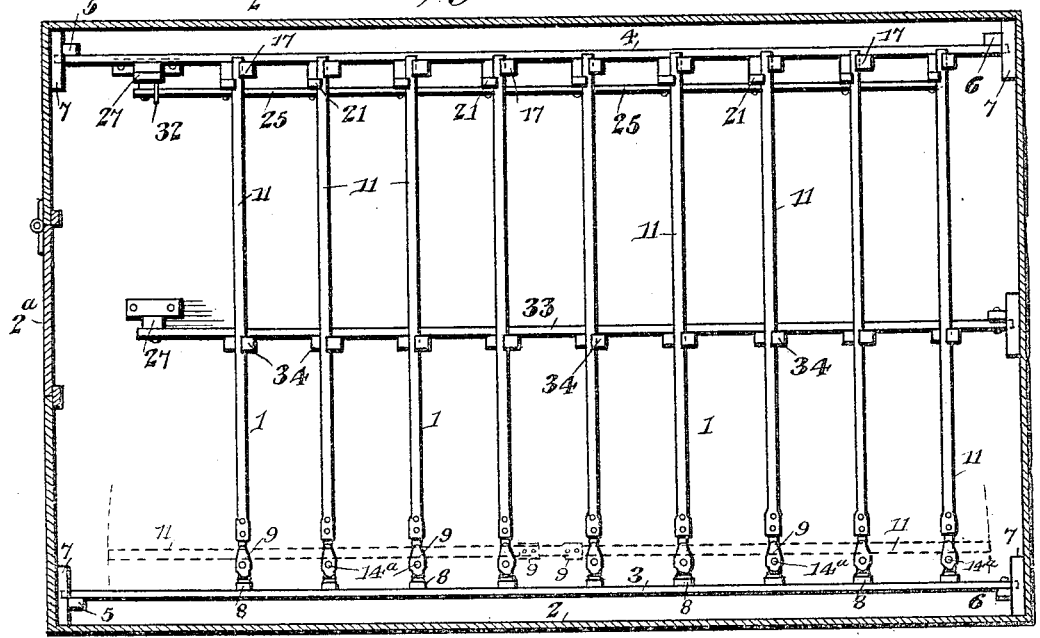
Figure 2:
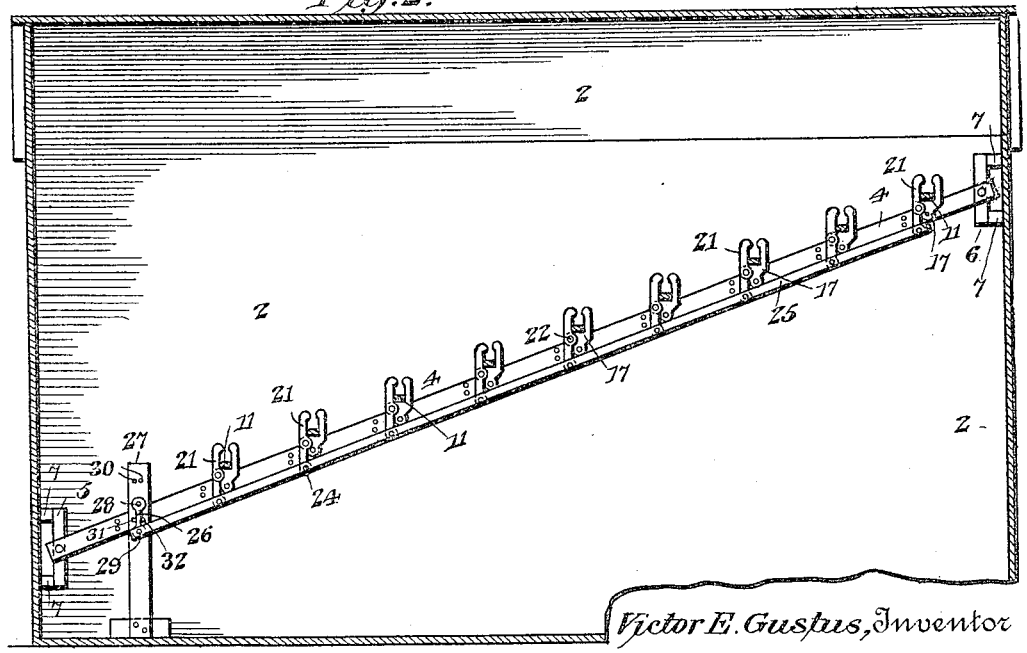
Figure 3:
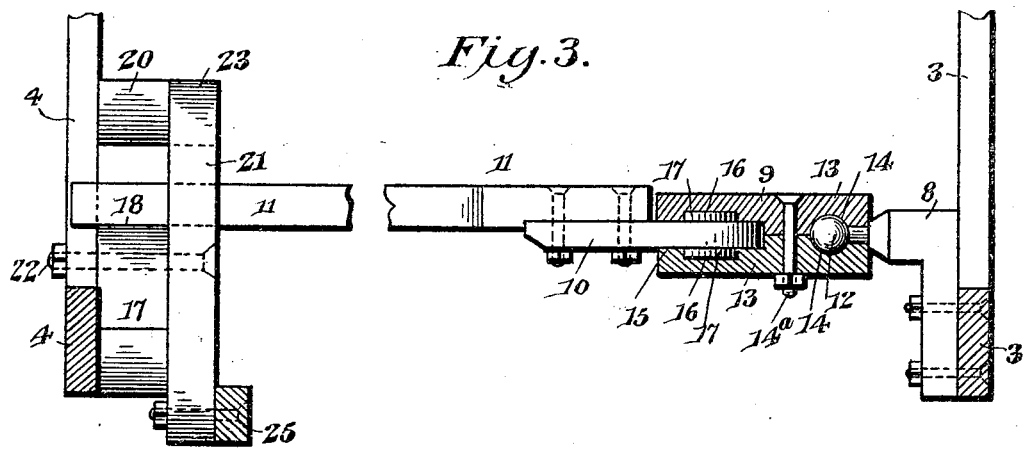
Figure 4:
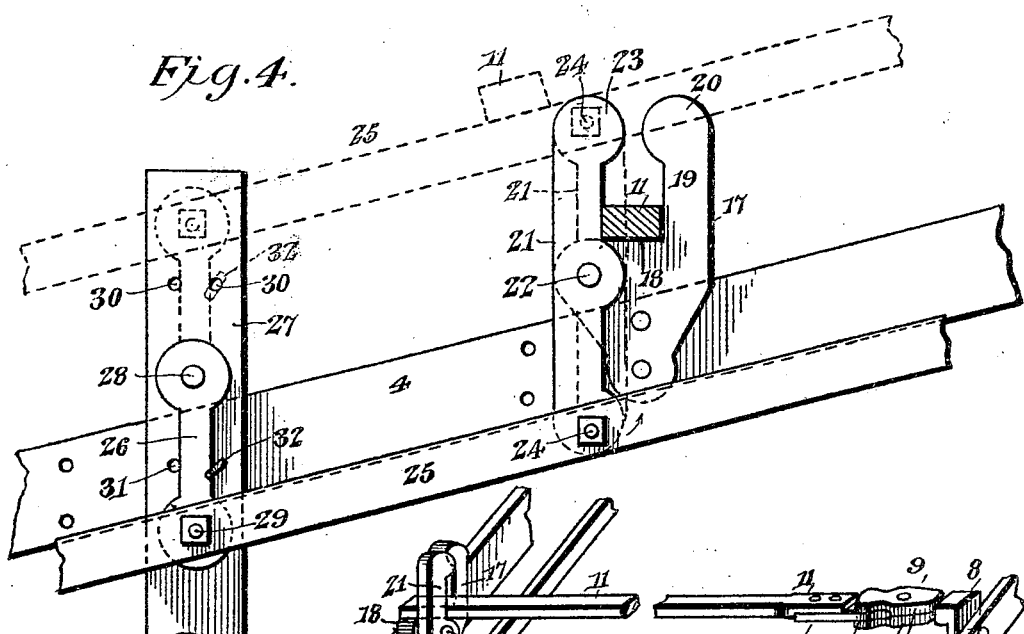
Figure 5:
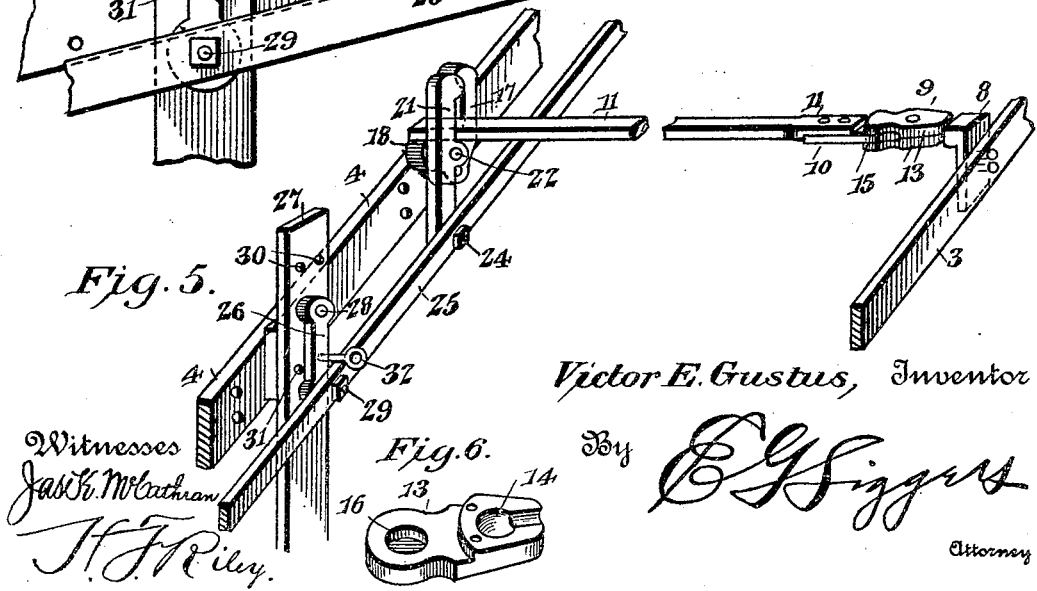
Figure 6:
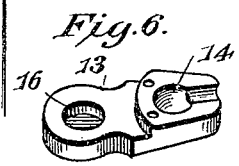

In the drawings, Figure 1 is a plan view of a poultry-roost constructed in accordance with this invention and shown applied to a poultry or hen house, the latter being in cross-section. Fig. 2 is a vertical longitudinal sectional view of the same. Fig. 3 is an enlarged detail view, partly in section, illustrating the manner of mounting the perch-bars. Fig. 4 is an enlarged detail sectional view illustrating the construction of the clamps and the means for operating the same. Fig. 5 is a detail perspective view of one of the perch-bars and the means for supporting the same. Fig. 6 is a detail perspective view of one of the plates of the intermediate member of the combined hinge and pivotal connection for one end of the perch-bars.

Like numerals of reference designate corresponding parts in all the figures of the drawings.

1 designates a series of perch-bars designed to extend across a poultry or hen house 2 in the usual manner and arranged horizontally at regular intervals and at different elevations, as clearly shown in Figs. 1 and 2 of the drawings. The perch-bars 1 are connected by the means hereinafter described with inclined side bars 3 and 4, located at opposite sides of the poultry or hen house and spaced from the side walls thereof and secured to the same by any suitable means, such as brackets 5 and 6, as clearly illustrated in Fig. 2 of the drawings. The brackets 5 and 6 preferably consist of vertical bars secured to suitable strips or pieces 7, arranged horizontally at the upper and lower ends of the vertical bars or pieces.

The transversely-disposed perch-bars are each connected with the inclined side bars 3 by means of a combined hinge and pivotal connection, presenting a fixed plate or member 8, an intermediate pivotal or rotatable member 9, and an oscillatory plate or member 10, which is secured by bolts or other suitable fastening devices to the end 11 of the perch-bars, preferably in a recess thereof, as clearly illustrated in Fig. 3 of the drawings. The fixed plate or end member 8, which is substantially L-shaped, is secured by bolts or other suitable fastening devices to the inclined side bar 3, and the attached portion is vertical, and the other portion is arranged horizontally and is provided with a pivot 12, terminating in a ball-shaped head, as clearly shown in Fig. 3 of the drawings. The intermediate pivotal or rotary member, which is mounted on the pivot, is composed of two plates or sections 13, provided at their inner faces with opposite grooves 14, enlarged at their inner ends to form concavities for the reception of the ball-shaped head. The plates or sections 13 of the intermediate member fit snugly around the horizontal pivot 12 and are secured to the same by a bolt 14$^a$ or other suitable fastening device. The grooves are located at one end of the intermediate pivotal or rotary member, and the other end of the same is bifurcated, the bifurcation 15 being formed by recessing the inner faces of the plates or sections, as clearly shown in Fig. 3 of the drawings. The recessed ends of the plates or sections 13 are provided with circular bearing-recesses 16, forming an eye or bearing for the reception of a pivot or pintle 17 of the oscillatory plate or member 10. The pivot or pintle 17 consists of circular bosses or enlargements projecting from the opposite faces of the oscillatory plate or member 10. The pivotal connection between the fixed plate or member and the intermediate member and the hinged connection between the latter and the oscillatory plate or member form a combined hinge and pivotal connection to permit the perch-bar to be rotated and oscillated for folding it out of the way and for presenting its edges and faces for cleaning and also for swinging it downward to facilitate the removal of vermin or accumulation. In folding the perch-bars those at the inner half of the poultry or hen house are swung around toward the outer end, which is provided with a suitable door 2ª, and the other perch-bars are swung inward, the perch-bars being adapted to cross each other, as indicated in dotted lines in Fig. 1 of the drawings. The other end of each transverse perch-bar is arranged on a seat of a bracket 17, which is secured to the other inclined side bar 4, as clearly shown in Figs. 4 and 5 of the drawings. The bracket, which has a lower attachment portion, is provided with an intermediate horizontal edge 18, forming the seat for the perch-bar. The bracket is provided at the back with an arm 19, extending vertically from the back of the seat and terminating at its upper end in a circular head or enlargement 20. The lower attachment portion of the bracket is tapered and is perforated for the reception of bolts or other suitable fastening devices for securing the bracket to the inclined side bar 4. The perch-bars are positively clamped on the seats of the brackets by means of levers 21, fulcrumed between their ends on the said brackets at points below the seats by means of bolts 22 or other suitable pivots. The upper arms of the levers constitute clamping-jaws and engage the outer side edges of the perch-bars and hold the same rigidly on the seats of the brackets. The terminals of the upper ends are provided with circular enlargements or heads 23, which project inwardly toward the heads 20 to form stops to positively prevent the perch-bars from being disengaged from the brackets.

The lower arms of the clamping-levers are pivoted by bolts 24 or other suitable fastening devices to a connecting rod or bar 25, which is adapted to be operated to simultaneously engage and release the perch-bars and also to lift the perch-bars from the seats and carry the same to points above the brackets, as indicated in dotted lines in Fig. 4 of the drawings. The clamping-lever is shown in full lines in engagement with the perch-bars in Fig. 4 of the drawings, and when it is swung in the direction of the arrow the upper clamping jaw or arm is carried away from the perch-bar and the connecting rod or bar 25 is moved upwardly and is adapted to engage and carry the free ends of the perch-bars upward. The connecting-bar 25 when in the position illustrated in Fig. 4 of the drawings presents a smooth surface to the free ends of the perch-bars, and the latter are adapted to be readily swung in either direction to hold them against the opposite side of the poultry or hen house for affording free access to the same. The front end of the operating-bar is supported by a link 26, pivoted at its upper end to a vertical bar or support 27 by a bolt 28 or other suitable fastening device and having its lower end pivoted to the connecting-bar at 29. The vertical bar or support 27 is provided with upper and lower perforations 30 and 31, adapted to receive a pin 32 for limiting the movement of the link, whereby the connecting-bar is retained in either of its positions. The perforations 30 and 31 are arranged in pairs, as clearly shown in Fig. 4, and the vertical bar or support 27, which extends above the inclined side bar 4, is located near the front end of the same and preferably extends upward from the floor of the poultry or hen house.

Any number of perch-bars may be provided, and they may be constructed of any desired length, and a central supporting-bar 33 may be employed when desired. The central supporting-bar is provided with a plurality of brackets 34, having seats and constructed similar to the brackets heretofore described. The central support is adapted to prevent long perch-bars from sagging under a comparatively heavy load.

It will be seen that the poultry-roost is exceedingly simple and inexpensive in construction, that it possesses great strength and durability, and that it is adapted to afford free access to a poultry or hen house and is capable of enabling the same to be conveniently cleaned. Furthermore, it will be clear that the connecting-bar when swung upward for lifting the perch-bars from the seats of the brackets presents a smooth upper face and is adapted to permit the perch-bars to slide freely on it.

In Fig. 6 of the drawings the plate or section 13 is provided with a pair of perforations to receive a pair of bolts, which may be employed instead of the single bolt shown in the other figures of the drawings.

Having thus fully described my invention, what I claim as new, and desire to secure by Letters Patent, is—

1. A device of the class described, comprising opposite supports, a plurality of perch-bars hingedly connected with one of the supports, and means for detachably clamping the perch-bars to the other support.

2. In a device of the class described, the combination with opposite supports, of a perch-bar movably mounted on one of the supports and detachably connected with the other support, said perch-bar being arranged to be folded against the support on which it is movably mounted.

3. A device of the class described, comprising opposite supports, a plurality of perch-bars, means for movably connecting the perch-bars with one of the supports, a plurality of brackets mounted on the other support and provided with seats receiving the perch-bars, and means for detachably clamping the perch-bars on the seats.

4. A device of the class described, comprising opposite supports, a perch-bar, a combined hinge and pivotal connection connecting the perch-bars with one of the supports, said connection comprising end members provided with transverse and longitudinal pivots, and an intermediate connecting member receiving the pivots, and means for detachably connecting the perch-bar with the other support.

5. A device of the class described, comprising opposite supports, a perch-bar, a combined hinge and pivotal connection connecting the perch-bars with one of the supports, said connection comprising a fixed member having a headed pivot disposed longitudinally of the perch-bar, a plate or member having a transverse pivot, and an intermediate connecting member composed of separable sections having opposite recesses receiving the said pivots, and means for detachably connecting the perch-bar with the other support.

6. A device of the class described, comprising opposite supports, a perch-bar, a combined hinge and pivotal connection connecting the perch-bars with one of the supports, said connection comprising a fixed member having a longitudinal pivot, an oscillatory member having a transverse pivot, and an intermediate connecting member composed of separable sections provided with opposite recesses to receive the pivots, said intermediate member being also bifurcated, and the oscillatory member being arranged to move in the bifurcation, and means for detachably connecting the perch-bar with the other support.

7. A device of the class described, comprising a perch-bar, a supporting-bracket provided with an intermediate seat receiving the perch-bar, said bracket being also provided with an upwardly-extending arm, and a clamping-lever mounted on the bracket and arranged to engage the perch-bar to retain the same on the seat.

8. A device of the class described, comprising a plurality of perch-bars, a plurality of brackets having seats receiving the perch-bars, clamping-levers arranged to engage the perch-bars for holding the same on the seats, and a bar connecting the clamping-levers and located beneath the perch-bars and arranged to lift the same off the seats.

9. A device of the class described, comprising a plurality of perch-bars, brackets having seats receiving the perch-bars, clamping-levers fulcrumed between their ends and arranged to clamp the perch-bars on the seats of the brackets, a bar connecting the levers, a link also connected with the bar, and means for engaging the link for holding the bar against movement.

10. A device of the class described, comprising a plurality of perch-bars, brackets having seats receiving the perch-bars, upright clamping-levers fulcrumed between their ends on the brackets, the upper arms of the levers being arranged to clamp the perch-bars, a bar connecting the lower arms of the levers and arranged to be carried upward by the same for lifting the perch-bars off the seats, and means for holding the levers against movement for supporting the perch-bars in an elevated position above the brackets.

11. A device of the class described, comprising a plurality of perch-bars, means for pivotally and hingedly mounting the perch-bars at one end thereof, and means for detachably holding the perch-bars at the other end thereof, whereby the perch-bars are adapted to be folded and also turned to present their several faces or edges for cleaning.

12. The combination with a perch-bar, of a bracket having a seat and provided with an arm extending upwardly from the seat and terminating in an enlargement or head, and a movable device engaging the perch-bar and extending upward therefrom and provided with an enlargement or head, said enlargement or head being extended inward over the perch-bars.

In testimony that I claim the foregoing as my own I have hereto affixed my signature in the presence of two witnesses.

VICTOR EMANUEL GUSTUS.

Witnesses:
W. M. STRAHN,
F. E. LUNDELL.